United States Patent
Porwal et al.

(10) Patent No.: US 11,821,658 B2
(45) Date of Patent: Nov. 21, 2023

(54) WATER HEATER AND COVER ASSEMBLY THEREFOR

(71) Applicant: Rheem Manufacturing Company, Atlanta, GA (US)

(72) Inventors: Piyush Porwal, Montgomery, AL (US); Miguel Ubaldo, Montgomery, AL (US); Tobey Fowler, Montgomery, AL (US); Damian Weitherspoon, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 11 days.

(21) Appl. No.: 17/126,586

(22) Filed: Dec. 18, 2020

(65) Prior Publication Data

US 2022/0196287 A1    Jun. 23, 2022

(51) Int. Cl.
| | |
|---|---|
| *F24H 9/02* | (2006.01) |
| *F24H 9/06* | (2006.01) |
| *F24H 9/13* | (2022.01) |
| *F24H 9/20* | (2022.01) |
| *F28F 9/02* | (2006.01) |
| *F16B 37/08* | (2006.01) |

(52) U.S. Cl.
CPC ............ *F24H 9/02* (2013.01); *F16B 37/0842* (2013.01); *F24H 9/06* (2013.01); *F24H 9/133* (2022.01); *F24H 9/2007* (2013.01); *F28F 9/0258* (2013.01)

(58) Field of Classification Search
CPC ... F24H 9/02; F24H 9/06; F24H 9/124; F24H 9/2007; Y10T 428/239; F28F 9/0258; F28F 9/00; F28F 9/001; F16B 37/0842

USPC .................................................. 122/19.2, 500
See application file for complete search history.

(56) References Cited

U.S. PATENT DOCUMENTS

| | | | | |
|---|---|---|---|---|
| 1,484,056 | A * | 2/1924 | Birtch ..................... | F24H 1/182 122/494 |
| 1,525,503 | A * | 2/1925 | Hauser .................... | F24H 1/186 122/363 |
| 1,609,858 | A * | 12/1926 | Bohon .................... | F24H 1/182 122/494 |
| 2,223,769 | A * | 12/1940 | Morrow ................... | F24H 9/02 122/19.2 |
| 2,243,249 | A * | 5/1941 | Craig ..................... | F24H 1/182 122/494 |
| 2,642,851 | A * | 6/1953 | McFerran ............... | F24H 1/182 122/494 |
| 3,065,764 | A * | 11/1962 | Lyle ....................... | F24H 9/133 137/896 |

(Continued)

*Primary Examiner* — Steven S Anderson, II
(74) *Attorney, Agent, or Firm* — Eversheds Sutherland (US) LLP

(57) ABSTRACT

A water heater and a cover assembly for the water heater is provided. The water heater includes a mixing valve disposed in fluid communication with each of a hot water conduit and a cold water pipe, to regulate temperature of hot water received from the hot water conduit. The cold water pipe branches from a cold water conduit and extends along a longitudinal axis of the tank to connect with the mixing valve. The cover assembly is mounted on a tank of the water heater. The cover assembly includes a first cover to conceal the cold water pipe, and a second cover to conceal the mixing valve and the hot water conduit extending between the tank and the mixing valve. The second cover is removably coupled to the first cover via one or more coupling elements.

19 Claims, 18 Drawing Sheets

(56) References Cited

U.S. PATENT DOCUMENTS

| | | | | |
|---|---|---|---|---|
| 4,872,443 | A | * | 10/1989 | Ruark ..................... F24H 1/205 |
| | | | | 49/463 |
| 5,085,205 | A | * | 2/1992 | Hall ......................... F24H 9/17 |
| | | | | 122/504 |
| D400,971 | S | * | 11/1998 | Vago ........................... D23/318 |
| 6,336,469 | B1 | * | 1/2002 | Nixon .................. F16K 31/563 |
| | | | | 122/504 |
| 8,991,638 | B2 | * | 3/2015 | Nelson .................... F28D 15/00 |
| | | | | 220/567.3 |
| 2002/0069868 | A1 | * | 6/2002 | Hughes .................. F24H 1/206 |
| | | | | 126/100 |
| 2012/0024968 | A1 | * | 2/2012 | Beyerle ............. G05D 23/1346 |
| | | | | 236/12.11 |
| 2012/0067301 | A1 | * | 3/2012 | Braathen ............... F24H 9/2021 |
| | | | | 122/19.1 |
| 2016/0084525 | A1 | * | 3/2016 | Rissler .................... F25B 1/005 |
| | | | | 62/238.7 |
| 2016/0201946 | A1 | * | 7/2016 | Shaffer .................. F24H 9/133 |
| | | | | 122/14.3 |
| 2016/0377322 | A1 | * | 12/2016 | Ward .................... F24H 9/2007 |
| | | | | 236/12.1 |
| 2018/0051911 | A1 | * | 2/2018 | Shaffer .............. G05D 23/1393 |

* cited by examiner

WATER HEATER AND COVER ASSEMBLY THEREFOR

TECHNICAL FIELD

The present disclosure relates, in general, to a water heater and, more specifically relates, to a cover assembly for the water heater.

BACKGROUND

Water heaters are used to heat and store a quantity of water in a tank thereof for subsequent on-demand delivery for residential and commercial use. Water heaters are known to use multiple piping to allow ingress and egress of water to and from a tank of the water heater. Besides, the water heaters also implement multiple valves coupled to the piping to regulate flow of water. Among the multiple valves, the water heaters include a mixing valve to regulate temperature of hot water extracted from the water heater. Typically, the mixing valve is either located at a top of the tank or along a curved outer surface of the tank. It is desired to conceal the mixing valve and the piping to enhance aesthetics of the water heater.

SUMMARY

According to one aspect of the present disclosure, a water heater is disclosed. The water heater includes a tank, a heating element to heat water received into the tank, a cold water conduit to direct flow of cold water into the tank, and a hot water conduit extending radially outward from the tank to direct hot water out of the tank. The water heater further includes a mixing valve in fluid communication with each of the hot water conduit and a cold water pipe branching from the cold water conduit. The mixing valve regulates temperature of hot water received from the hot water conduit. The water heater also includes a cover assembly mounted on the tank to conceal each of the mixing valve, the hot water conduit, and the cold water pipe. In an embodiment, the cover assembly is made of plastic or metal. The cover assembly includes a first cover to conceal the cold water pipe extending along a longitudinal axis of the tank and extending between the mixing valve and the cold water conduit. The cover assembly further includes a second cover to conceal the mixing valve and the hot water conduit extending between the tank and the mixing valve. The second cover is removably coupled to the first cover via one or more coupling elements.

In one embodiment, the one or more coupling elements include a hinge, a snap lock, a buckle lock, a push button spring snap, or combinations thereof. The one or more coupling elements include a protrusion and an engaging member configured to releasably engage with the protrusion to define a snap lock mechanism. In an embodiment, the protrusion is located on an inner surface of the first cover and the engaging member is located on an inner surface of the second cover. In another embodiment, a first coupling element is located on a first side of the cover assembly and a second coupling element is located on a second side of the cover assembly. In yet another embodiment, a first end portion of the second cover is rotatably coupled to the first cover via a hinge and a second end portion of the second cover is coupled to the first cover via the snap lock mechanism.

According to another aspect of the present disclosure, a cover assembly for a water heater is disclosed. The cover assembly includes a first cover to conceal a cold water pipe extending along a longitudinal axis of the tank and extending between a mixing valve and a cold water conduit provided to direct flow of cold water into the tank. The cover assembly further includes a second cover to conceal each of a hot water conduit extending outward from the tank and a mixing valve in fluid communication with the hot water conduit. The second cover is removably coupled to the first cover via one or more coupling elements and defines an aperture to allow access to an outlet of the mixing valve. In an embodiment, the one or more coupling elements include a hinge, a snap lock, a buckle, a push button spring snap, or combinations thereof.

The one or more coupling elements include a protrusion and an engaging member configured to releasably engage with the protrusion to define a snap lock mechanism. In one embodiment, the protrusion is located on an inner surface of the first cover and the engaging member is located on an inner surface of the second cover. In another embodiment, the second cover is snap fitted with the first cover along a longitudinal axis of the cover assembly. In yet another embodiment, the second cover is snap fitted with the first cover in a direction inclined to the longitudinal axis of the cover assembly. In yet another embodiment, the second cover includes two protrusions on each of a first side and a second side thereof, and the first cover includes two engaging members on each of a first side and a second side thereof. With such arrangement, the second cover snaps over the first cover to allow the protrusions on the first side and the second side of the second cover to slide into corresponding engaging members of the first cover.

According to yet another aspect of the present disclosure, a method of mounting a cover assembly on a water heater is disclosed. The method includes mounting a first cover of the cover assembly on a tank of the water heater to conceal a cold water pipe branching from a cold water conduit that directs flow of cold water into the tank. The method further includes coupling a second cover of the cover assembly with the first cover via one or more coupling elements to conceal a mixing valve and a hot water conduit extending between the tank and the mixing valve. In an embodiment, coupling the second cover with the first cover includes engaging at least one protrusion of the second cover with at least one engaging member of the first cover. Further, engaging the at least one protrusion of the second cover with at the least one engaging member of the first cover includes aligning the second cover with the first cover in a direction along a longitudinal axis of the cover assembly. In yet another embodiment, engaging the at least one protrusion of the second cover with at the least one engaging member of the first cover includes aligning the second cover with the first cover in a direction inclined to the longitudinal axis of the cover assembly. In yet another embodiment, engaging the at least one protrusion of the second cover with at the least one engaging member of the first cover is achieved via a snap lock, a buckle lock, a push button spring snap, or combinations thereof.

BRIEF DESCRIPTION OF THE DRAWINGS

A better understanding of embodiments of the present disclosure (including alternatives and/or variations thereof) may be obtained with reference to the detailed description of the embodiments along with the following drawings, in which.

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1A:
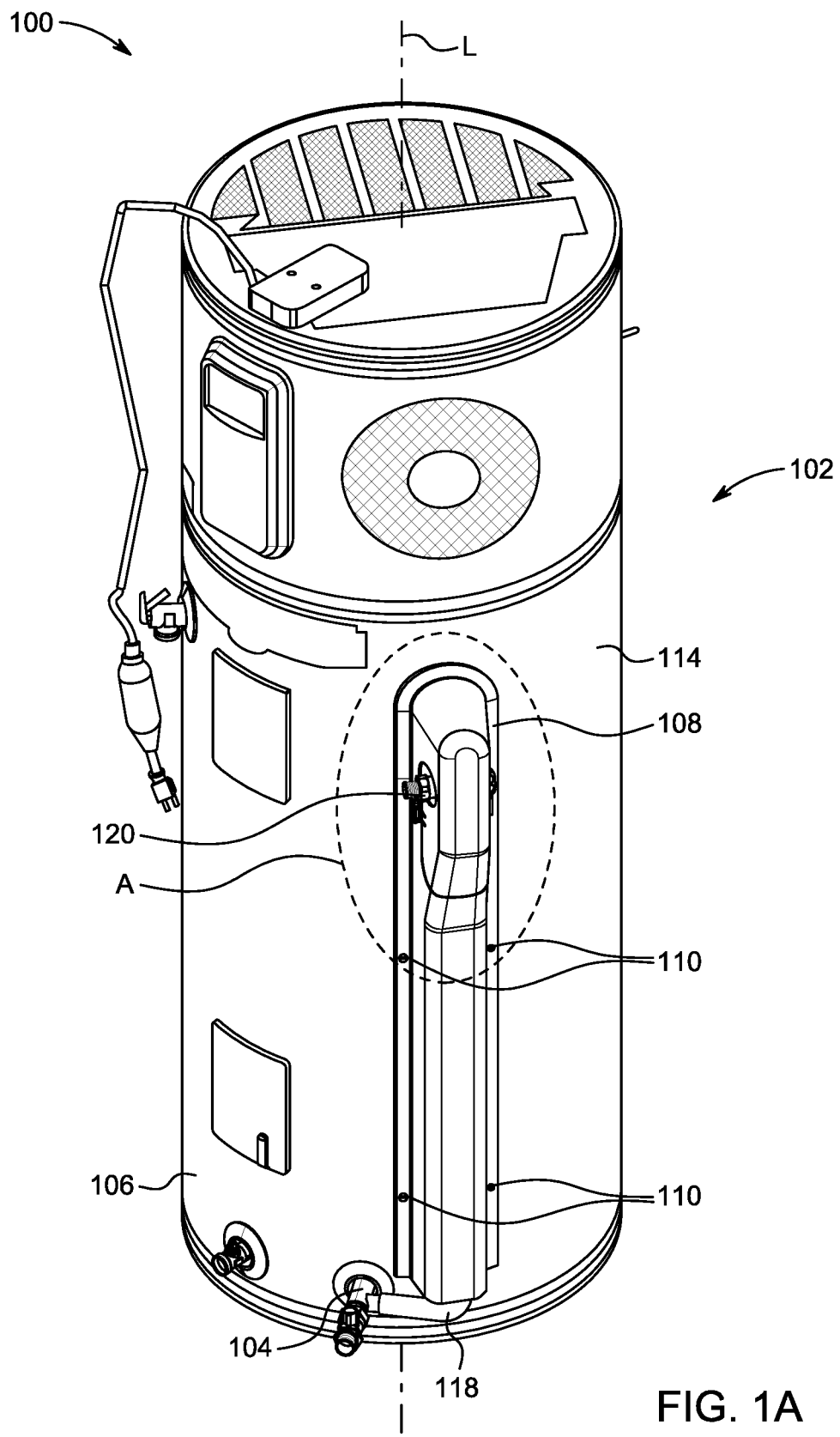
FIG. 1A is a perspective view of a water heater showing a cover assembly mounted thereon, according to an embodiment of the present disclosure.

Referring to FIG. 1A, a perspective view of a water heater 100 is illustrated. The water heater 100 includes a cylindrical tank 102 and a cold water conduit 104 connected to the tank 102, particularly at a bottom portion 106 of the tank 102, to direct flow of cold water into the tank 102. The water heater 100 further includes a heating element (not shown) disposed in the tank 102 and configured to heat water received into tank 102. As shown in FIG. 1A, the water heater 100 also includes a cover assembly 108 mounted on the tank 102 and extending along a longitudinal axis "L" of the tank 102. Advantageously, the cover assembly 108 is mounted to the tank 102 using minimum number of fasteners, for example, four screws 110.

Figure 1B:
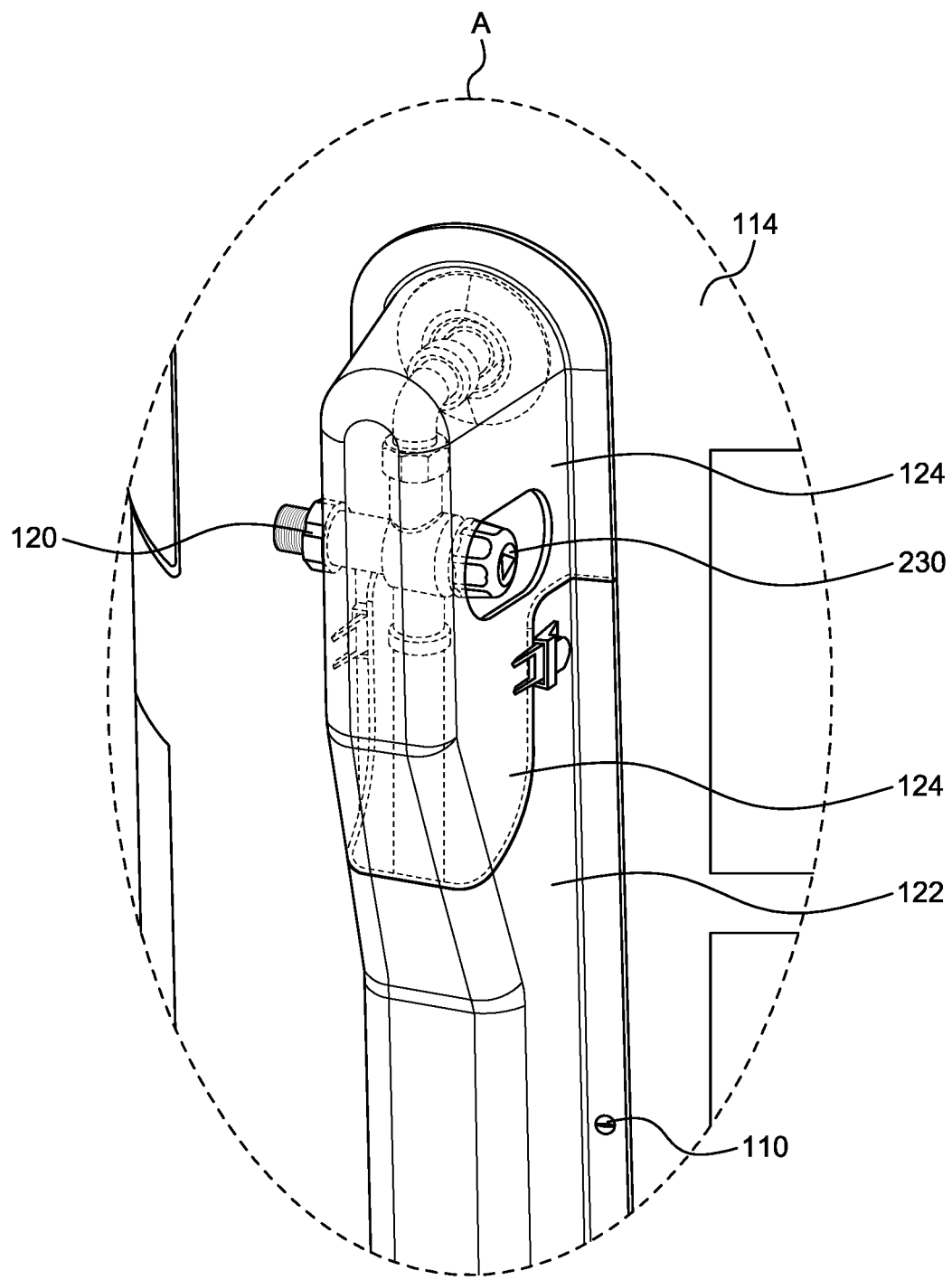
FIG. 1B is a perspective view of a portion 'A' of the water heater showing a mixing valve concealed by the cover assembly, according to an embodiment of the present disclosure.
Figure 1C:
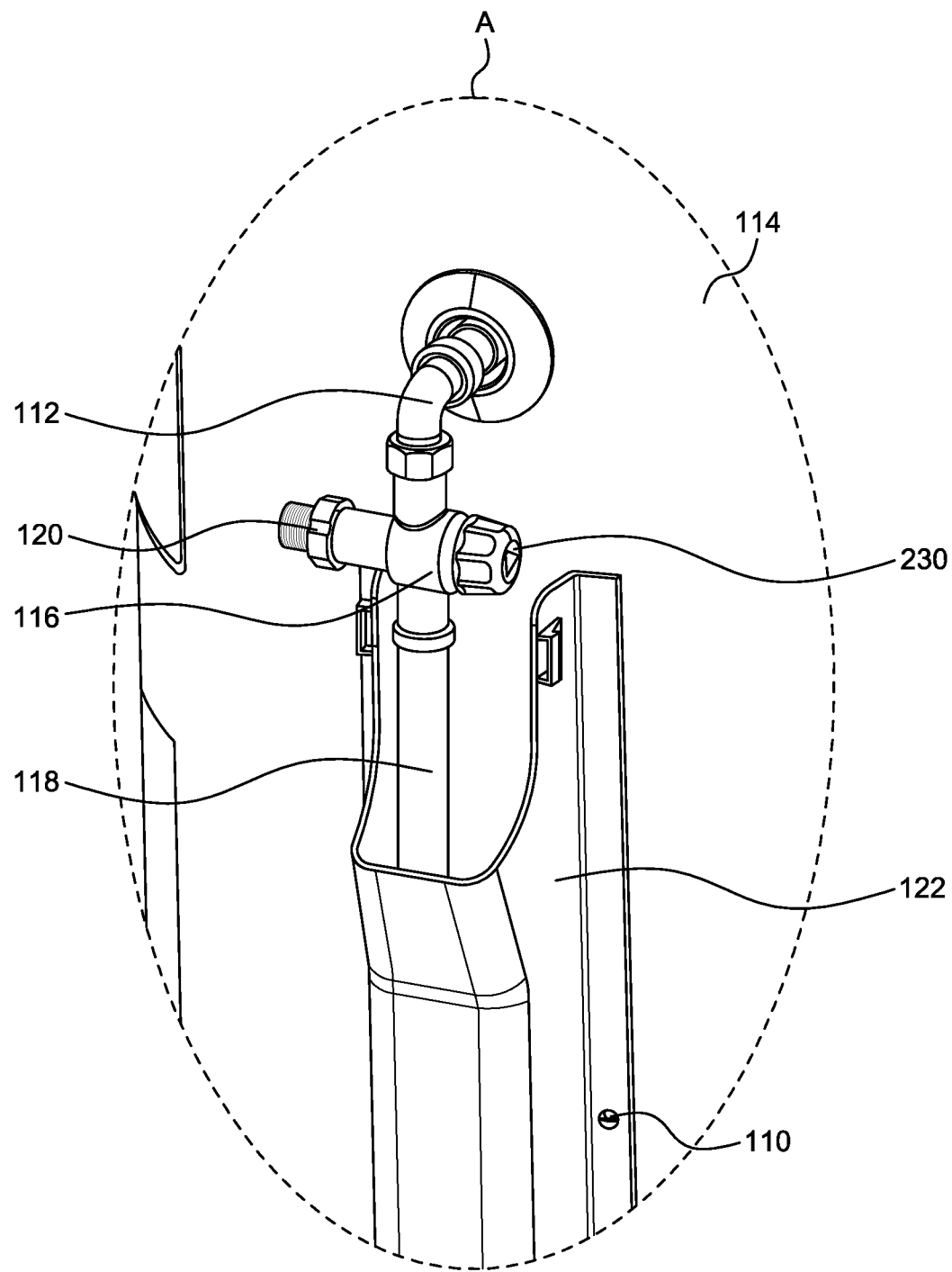
FIG. 1C is a perspective view of the portion 'A' of the water heater showing components of the mixing valve, according to an embodiment of the present disclosure.

FIG. 1B and FIG. 1C illustrates perspective views of a portion "A" of the water heater 100 of FIG. 1. Extraction of heated water is achieved through a hot water conduit 112 (see FIG. 1C) extending radially outward from an outer surface 114 the tank 102 and configured to direct hot water out of the tank 102. The water heater 100 includes a mixing valve 116 (see FIG. 1C) located at the outer surface 112 and configured to regulate the temperature of water heated in the tank 102. For the purpose of such regulation, the mixing valve 116 is disposed in fluid communication with each of the hot water conduit 108 and a cold water pipe 118 branching (see FIG. 1A) from the cold water conduit 104 and extending along the longitudinal axis "L" of the tank 102. The mixing valve 110 includes a knob 230 to set a degree of mixing of the hot water and the cold water, and a hot water outlet 120 configured to connect with an end-use application, such as shower and washing appliances.

The cover assembly 108 is configured to conceal (see FIG. 1A and FIG. 1C) each of the mixing valve 116, the hot water conduit 112, and the cold water pipe 118. In an embodiment, the cover assembly 108 includes a first cover 122 and a second cover 124 detachably coupled to the first cover 122. In one embodiment, the cover assembly 108 is made of, but not limited to, plastic or metal. Preferably, the cover assembly 108 may be made of a same material as that of the tank 102, to achieve uniformity in appearance and enhance aesthetics of the water heater 100.

Figure 2A:
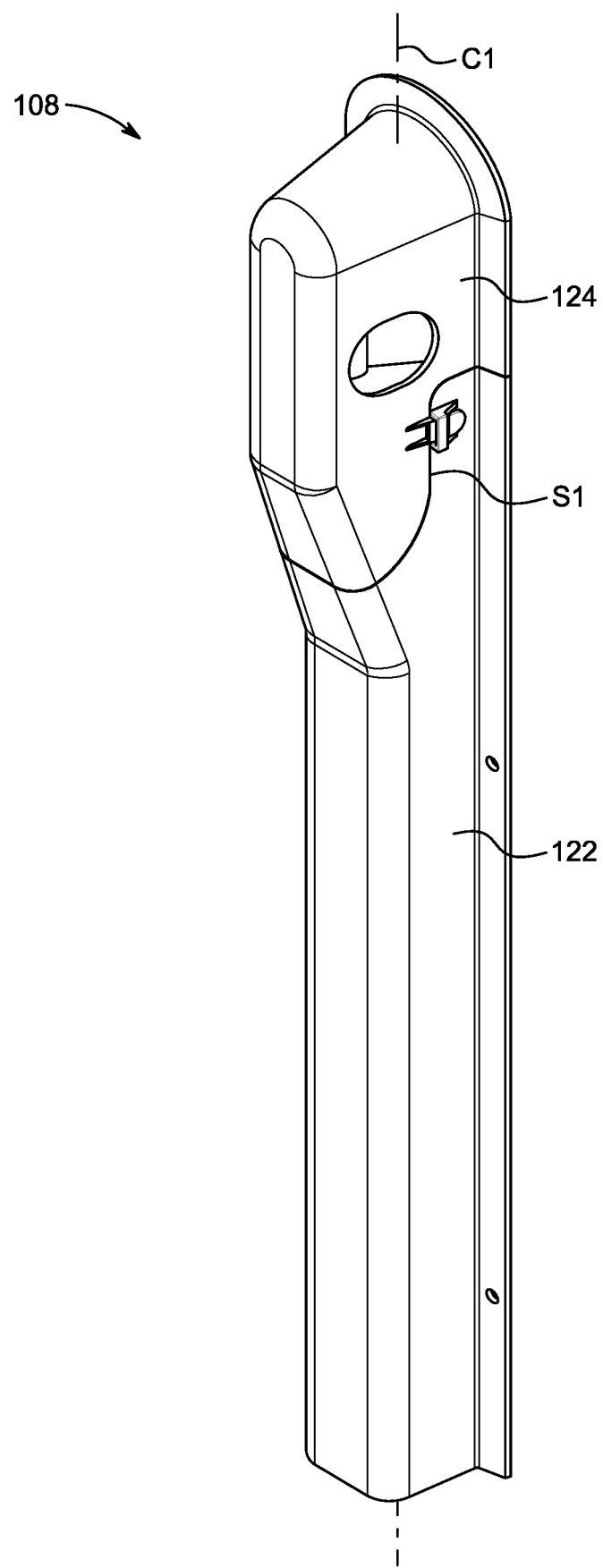
FIG. 2A is a front perspective view of the cover assembly, according to a first embodiment of the present disclosure.

Referring to FIG. 2A, a front perspective view of the cover assembly 108 is illustrated according to a first embodiment of the present disclosure. The first cover 122 is configured to conceal the cold water pipe 118 extending between the mixing valve 116 and the cold water conduit 104. The second cover 124 is configured to conceal the mixing valve 116 and the hot water conduit 112. Further, the second cover 124 is detachably coupled (alternatively referred to as "removably coupled" in the present disclosure) to the first cover 122 along a line of separation "S1". As used herein, the term "line of separation" refers to a contour along which the cover assembly 108 is cut to form the first cover 122 and the second cover 124. Preferably, the second cover 124 is coupled to the first cover 122 via one or more coupling elements (see FIG. 2C and FIG. 2D).

In an embodiment, the one or more coupling elements 126 may be implemented as a hinge, a snap lock, a buckle lock, a push button spring snap, or combinations thereof. In the illustrated embodiment, the second cover 124 is removably coupled to the first cover 122 via a snap lock. As such, the second cover 124 may be selectively detached from the first cover 122 to allow access to the mixing valve 116 (see FIG. 1C). Further, in cases where maintenance activity needs to be carried out on the cold water pipe 118, the first cover 122 may be removed from the tank 102 with minimum human effort of unscrewing the screws 110. Advantageously, the cover assembly 108 allows selective detachment of each of the first cover 122 and the second cover 124 from the tank 102, and thereby allows enhances accessibility and serviceability of the cold water pipe 118 and mixing valve 116, respectively.

Figure 2B:
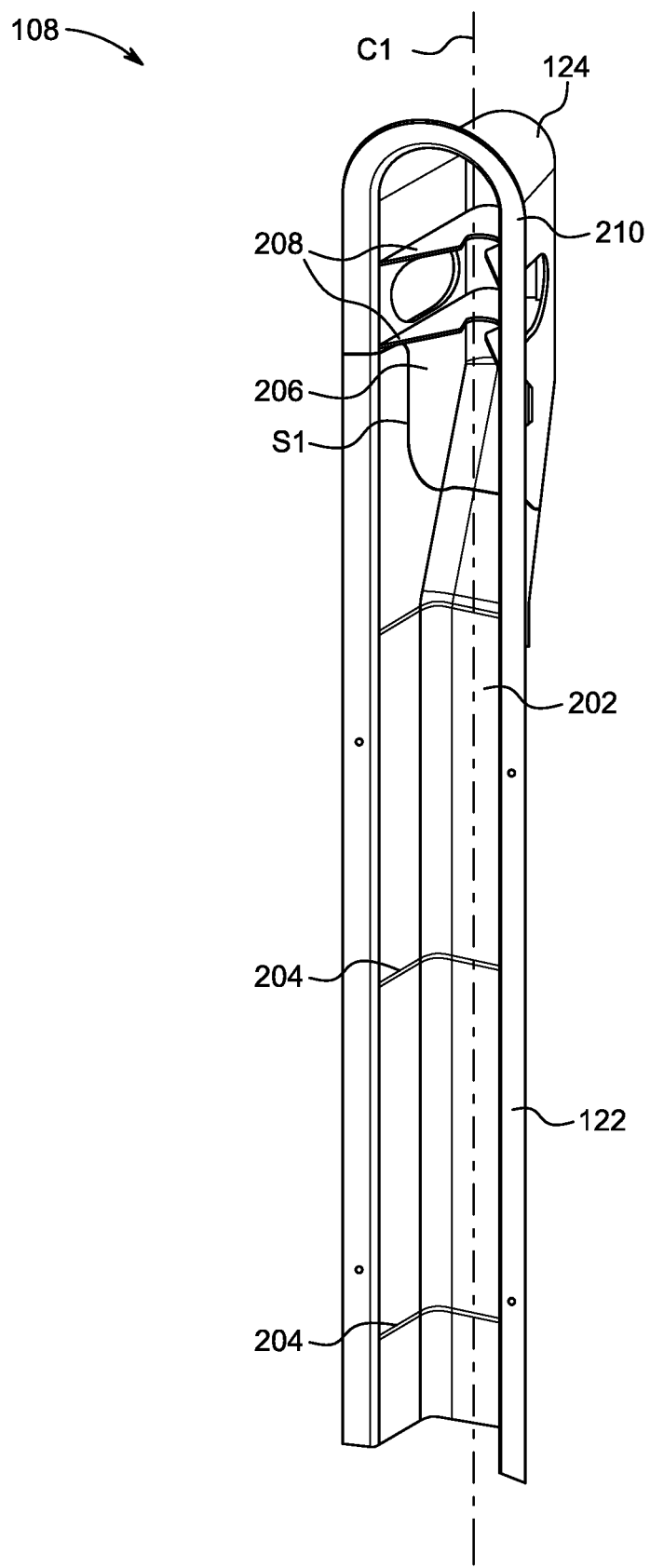
FIG. 2B is a rear perspective view of the cover assembly, according to the first embodiment of the present disclosure.

FIG. 2B illustrates a rear perspective view of the cover assembly 108, according to the first embodiment of the present disclosure. The cover assembly 108 may be formed from molding process. Accordingly, an inner surface 202 of the first cover 122 may be molded to include one or more ribs 204 to add strength to the first cover 122, and an inner surface 206 of the second cover 124 may be molded to include one or more ribs 208 to add strength to the second cover 124. In an embodiment, size of the second cover 124 and position of the ribs 208 on the inner surface 206 thereof may be predetermined based on size of the mixing valve 116, to ease mounting of the second cover 124 on the tank 102 without causing any interference with or damage to the mixing valve 116. In some embodiments, a surface 210 of the second cover 124 configured to abut the outer surface 114 of the tank 102 may include an anti-rust lining (not shown) to prevent development of rust and ease removal of the second cover 124 from the outer surface 114 of the tank 102. For example, the surface 210 may be coated with an epoxy anti-corrosive.

Figure 2C:
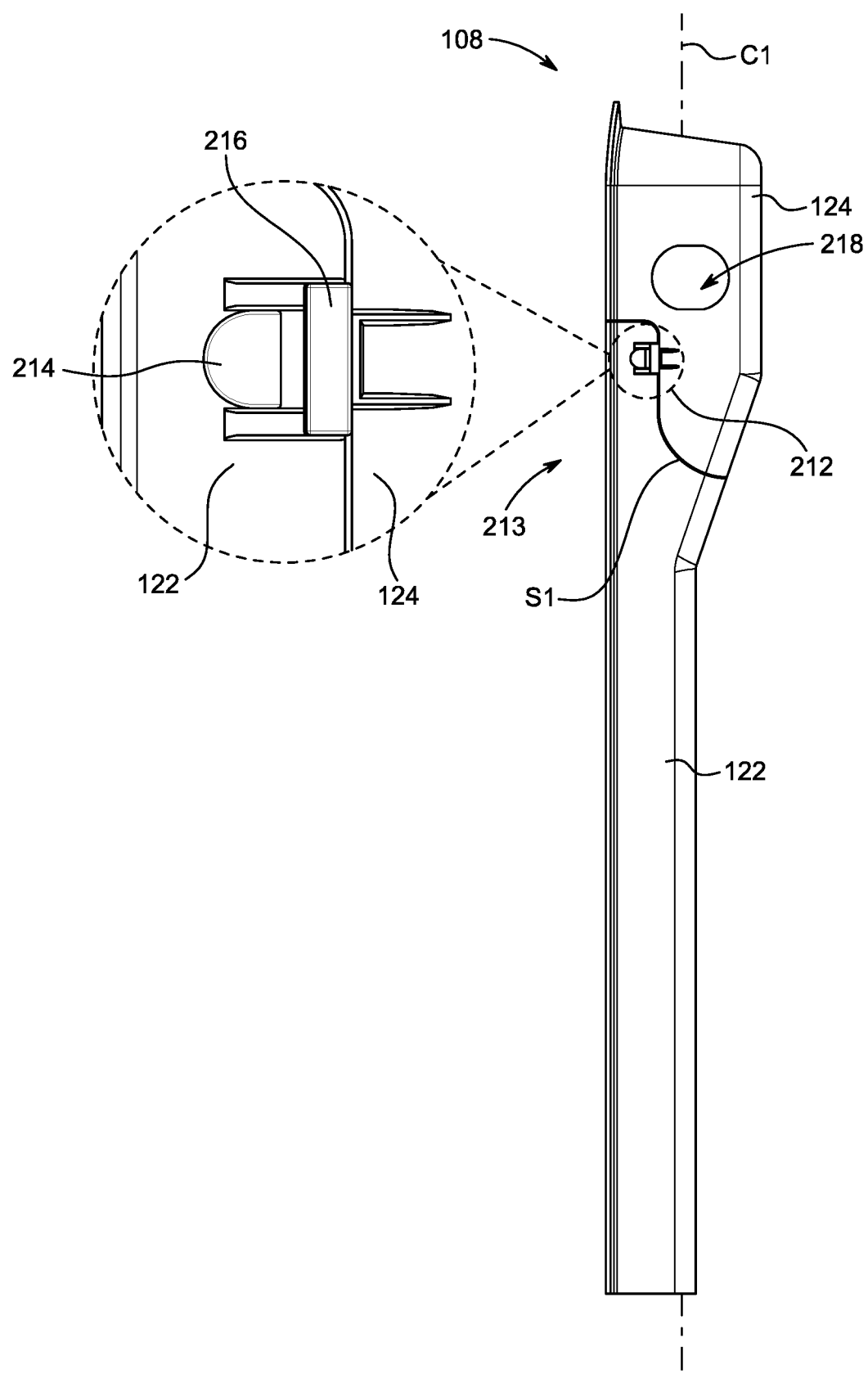
FIG. 2C is a left side view of the cover assembly, according to the first embodiment of the present disclosure.
Figure 2D:
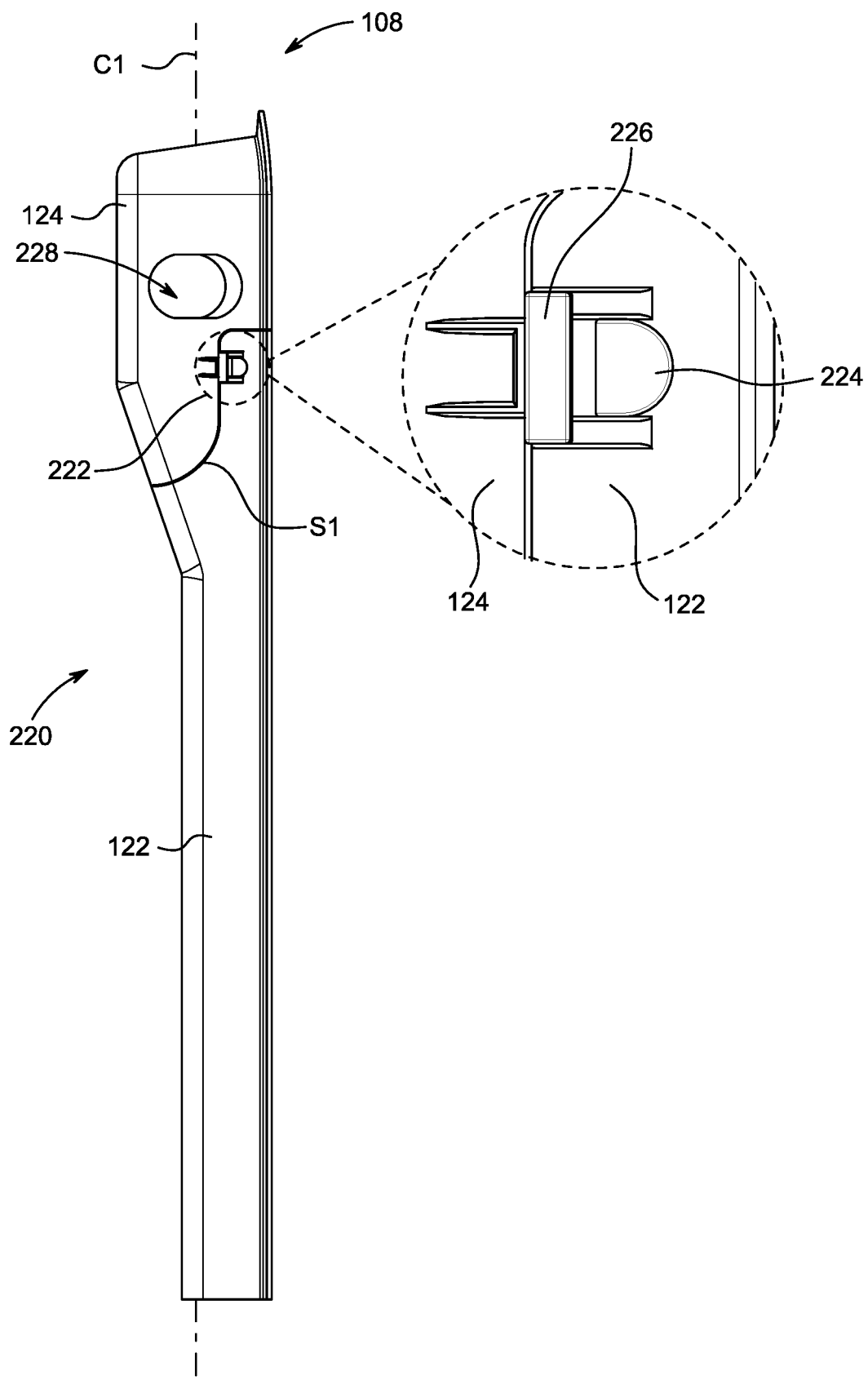
FIG. 2D is a right side view of the cover assembly, according to the first embodiment of the present disclosure.

FIG. 2C and FIG. 2D illustrates a left side view and a right side view, respectively, of the cover assembly 108. In an embodiment, the one or more coupling elements of the cover assembly 108 includes a first coupling element 212 located on a first side 213 (also referred to as "the left side") thereof. The first coupling element 212 includes a first protrusion 214 located on the second cover 124 and a first engaging member 216 located on the first cover 212. The first engaging member 216 is configured to releasably engage with the first protrusion 214 to define a snap lock mechanism. The term "releasably engage" refers to an arrangement that allows selective detachment of the first protrusion 214 from the first engaging member 216. For example, the first protrusion 214 may be manually pushed in a direction inward with respect to the cover assembly 108 to disengage the first protrusion 214 from the first engaging member 216. Size of the first coupling element 212 may be sufficiently large to allow a human finger to access the first protrusion 214. Further, the cover assembly 108, at the first side 213, defines a first aperture 218 configured to allow access to an outlet, such as the hot water outlet 120 (see FIG. 1A and FIG. 1B) of the mixing valve 116. A water supply pipe (not shown) configured to supply the hot water from the tank 102 to the end-use application may be connected to the hot water outlet 120 via the first aperture 218.

Similarly, on a second side 220 (also referred to as "the right side") shown in FIG. 2D, the cover assembly 108 includes a second coupling element 222 having a second protrusion 224 located on the second cover 124 and a second engaging member 226 located on the first cover 122. The second protrusion 224 and the second engaging member 226 together defines the snap lock mechanism. In addition, the cover assembly 108 defines a second aperture 228 configured to allow access to the knob 230 of the mixing valve 116 (see FIG. 1B). As such, manual setting of the mixing valve 116 may be performed without the need to unmount the second cover 124.

Once the first cover 122 is mounted on the tank 102, the second cover 124 may be aligned with the first cover 122 in a direction inclined to a longitudinal axis 'C1' of the cover assembly 108. In the illustrated embodiment, the second cover 124 is aligned with the first cover 122 in a direction perpendicular to the longitudinal axis 'C1' of the cover assembly 108. Particularly, the first protrusion 214 and the second protrusion 224 are aligned with the first engaging member 216 and the second engaging member 226, respectively. The second cover 124 may then be moved towards the first cover 122 until the first protrusion 214 and the second protrusion 224 slide into respective engaging members 216, 226, to secure the second cover 124 onto the first cover 122. Although the first embodiment illustrates two coupling elements, one on each side of the cover assembly 108, in some embodiments, the cover assembly 108 may include two or more such coupling elements to secure the second cover 124 onto the first cover 122 with added rigidity. Further, in some embodiments, location of the protrusions and the engaging members may be interchanged with respect to the first cover 122 and the second cover 124.

Figure 3A:
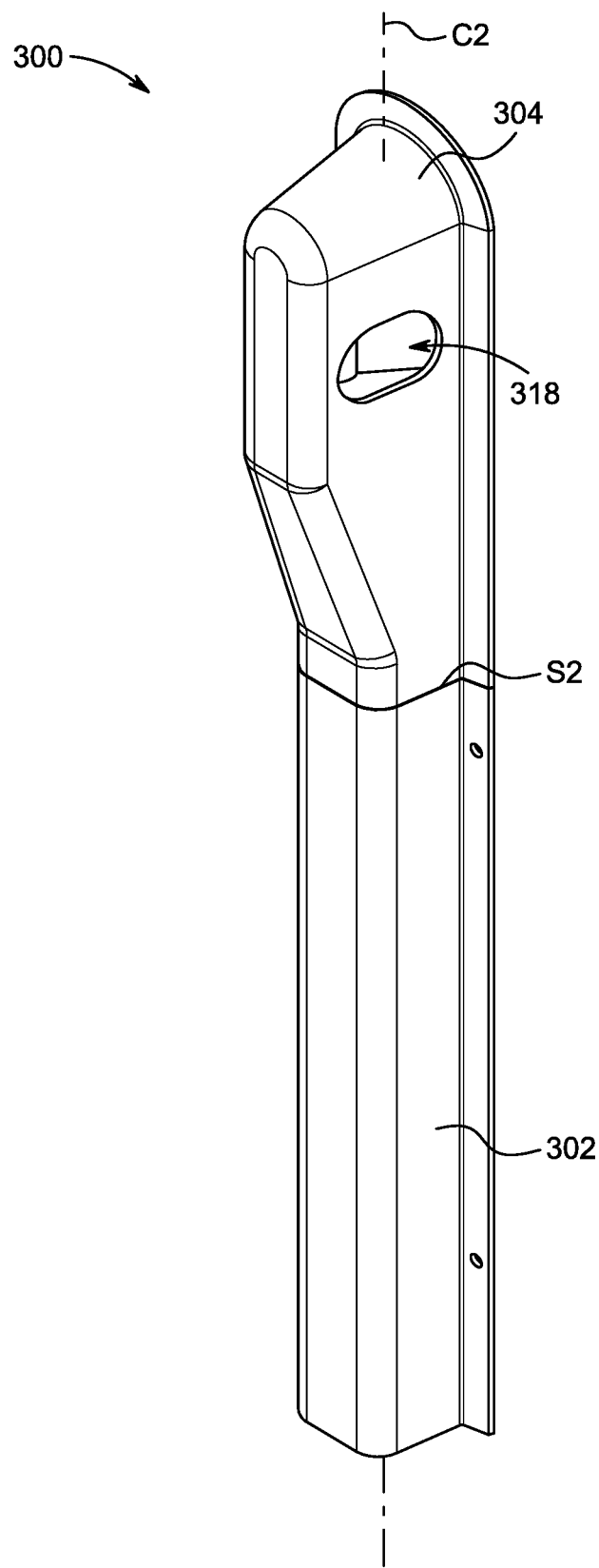
FIG. 3A is a front perspective view of the cover assembly, according to a second embodiment of the present disclosure.

FIG. 3A illustrates a front perspective view of a cover assembly 300 according to a second embodiment of the present disclosure. A line of separation "S2" in the cover assembly 300 defines a first cover 302 configured to conceal the cold water pipe 118, and a second cover 304 configured to conceal the mixing valve 116 and the hot water conduit 112.

Figure 3B:
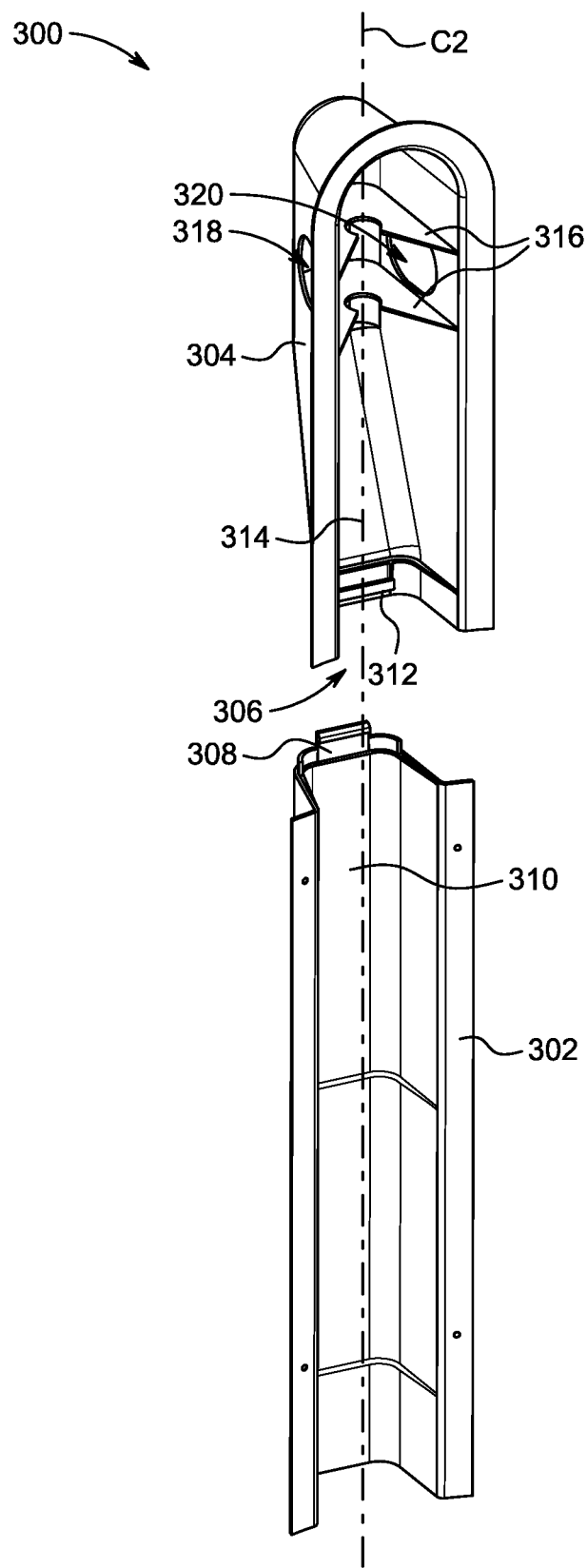
FIG. 3B is an exploded rear view of the cover assembly, according to the second embodiment of the present disclosure.

An exploded rear view of the cover assembly 300 is illustrated in FIG. 3B. According to the second embodiment, the cover assembly 300 includes a coupling element 306 located along the line of separation "S2". Particularly, the coupling element 306 includes a protrusion 308 located on an inner surface 310 of the first cover 302 and an engaging member 312 located on an inner surface 314 of the second cover 304. As such, alignment of the engaging member 312 with the protrusion 308 allows the second cover 304 to be snap fitted with the first cover 302 along a longitudinal axis "C2" of the cover assembly 300. In another embodiment, location of the protrusion 308 and the engaging member 312 may be interchanged. In some embodiments, the cover assembly 300 may include two or more coupling elements along the line of separation "S2". Presence of the coupling element 306 on the inner surface of the cover assembly 300 adds to the aesthetics of the cover assembly 300. The cover assembly 300 may further include one or more ribs 316 to add strength to the second cover 304, a first aperture 318 to allow access to the knob 230 of the mixing valve 116, and a second aperture 320 to allow access to the hot water outer 120 of the mixing vale 116.

Figure 4A:
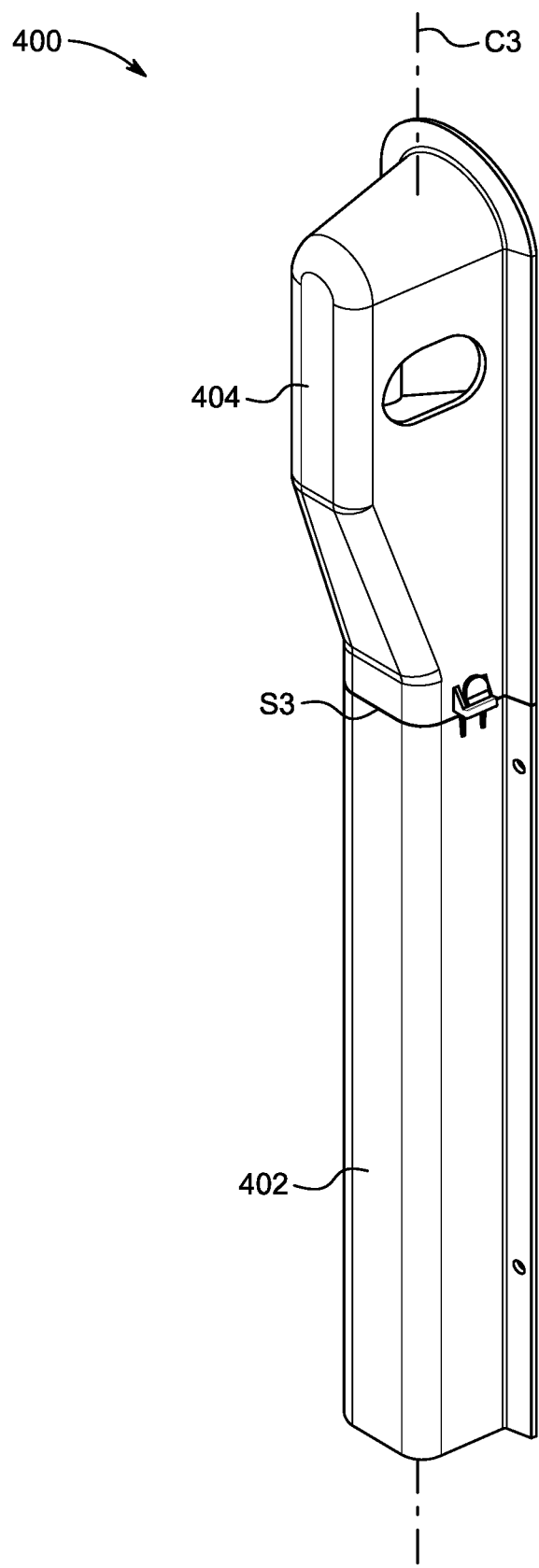
FIG. 4A is a front perspective view of the cover assembly, according to a third embodiment of the present disclosure.
Figure 4B:
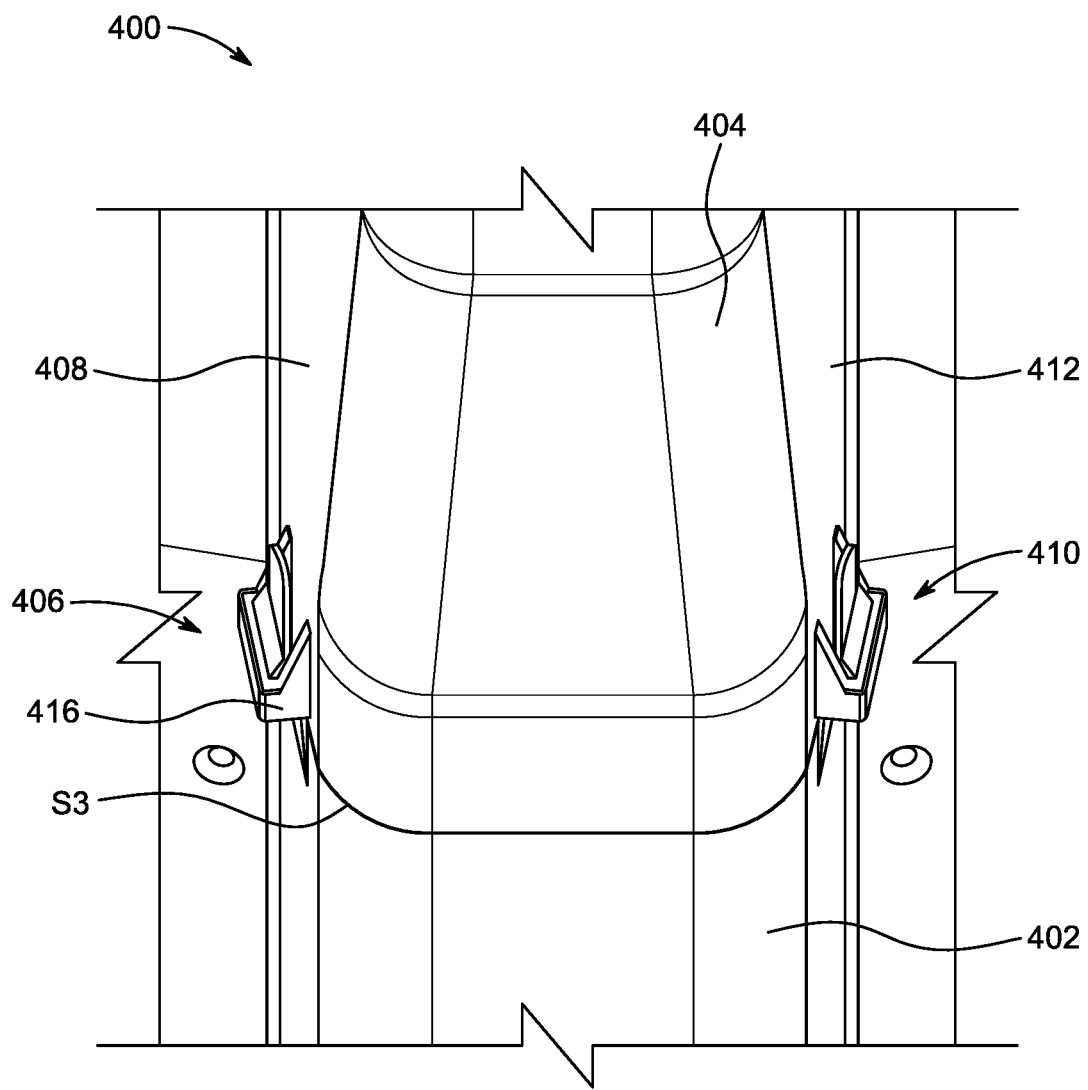
FIG. 4B is a front view of a portion of the cover assembly of FIG. 4A, according to the third embodiment of the present disclosure.
Figure 4C:
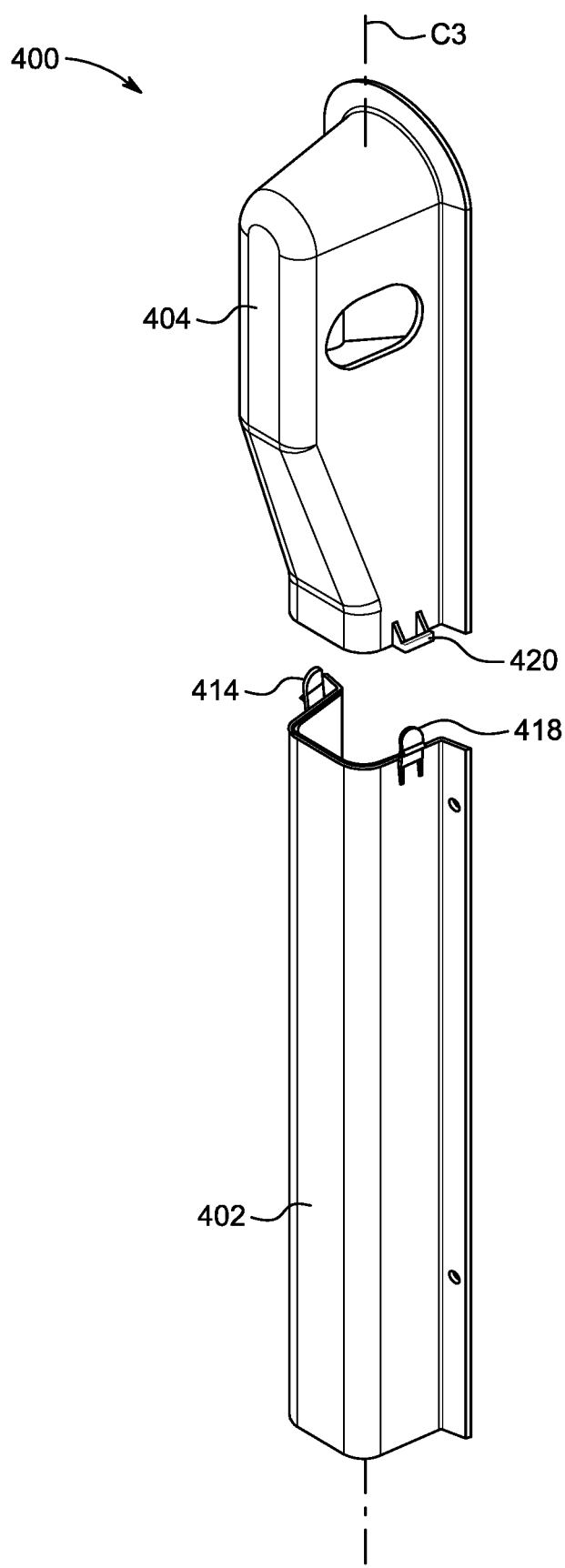
FIG. 4C is an exploded view of the cover assembly of FIG. 4A, according to the third embodiment of the present disclosure.

FIG. 4A illustrates a front perspective view of a cover assembly 400 and FIG. 4B illustrates a front view of a portion of the cover assembly 400, according to a third embodiment of the present disclosure. A line of separation "S3" in the cover assembly 400 defines a first cover 402 and a second cover 404. The cover assembly 400 includes two coupling elements, such as a first coupling element 406 located on a first side 408 thereof and a second coupling element 410 located on a second side 412 thereof. As seen in FIG. 4A and FIG. 4B, each of the first coupling element 406 and the second coupling element 410 is located along the line of separation "S3". As such, protrusions of each coupling element snap fits with a corresponding engaging member along a longitudinal axis "C3" of the cover assembly 400.

The first coupling element 406 includes a first protrusion 414 located on the first cover 402 and a first engaging member 416 (see FIG. 4B) located on the second cover 404. The second coupling element 410 includes a second protrusion 418 located on the first cover 402 and a second engaging member 420 located on the second cover 404. Further, the second cover 404 is snap fitted with the first cover 402 along the longitudinal axis "C3" of the cover assembly 400.

Figure 5A:
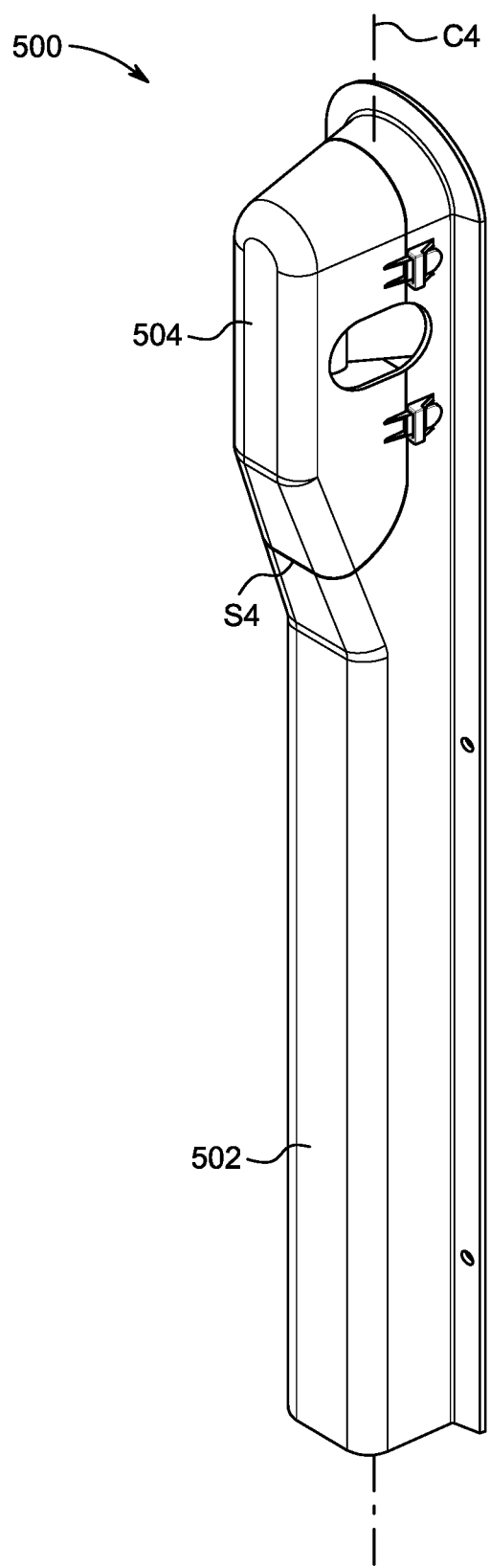
FIG. 5A is a front perspective view of the cover assembly, according to a fourth embodiment of the present disclosure.
Figure 5B:
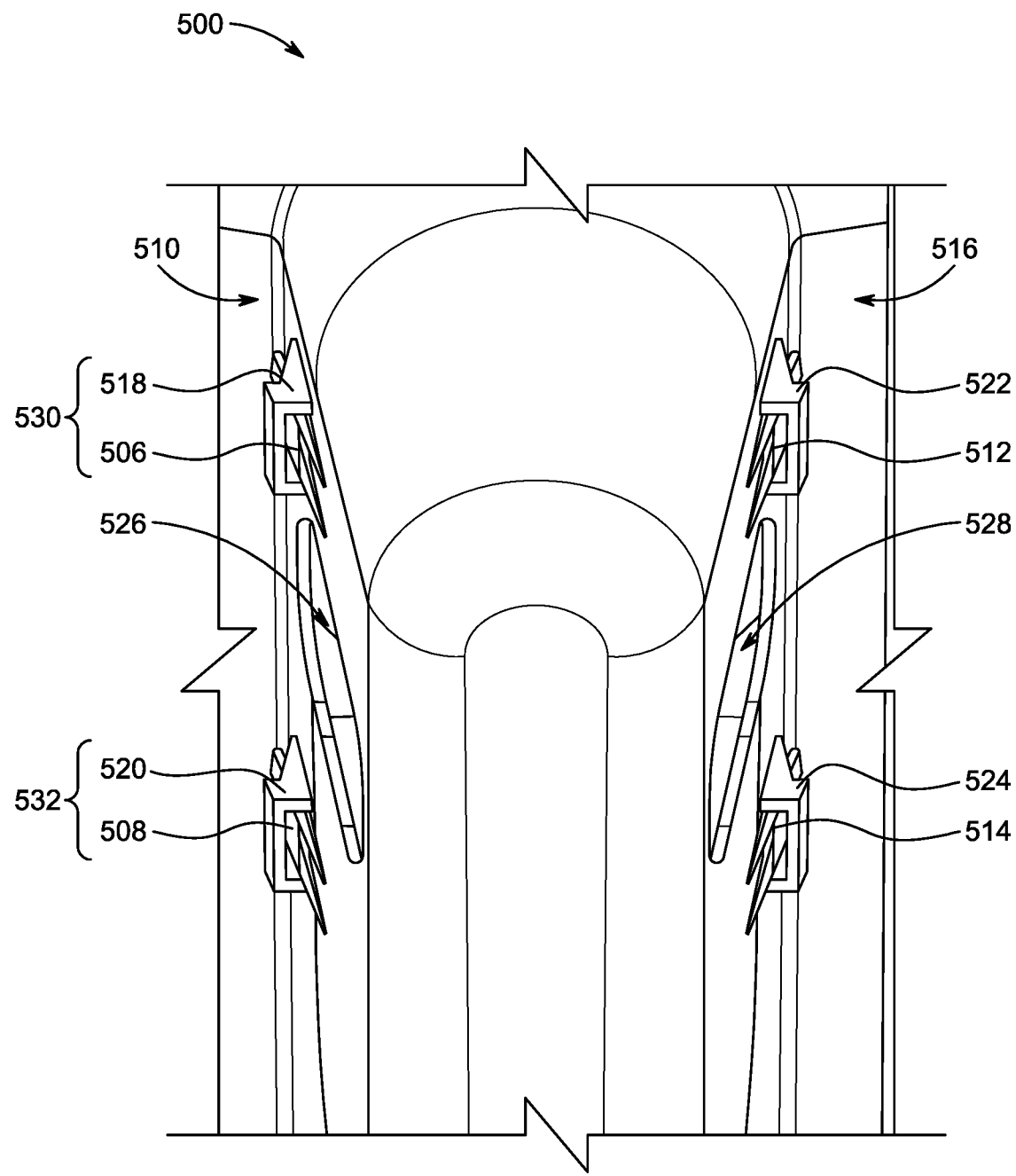
FIG. 5B is a front view of a portion of the cover assembly of FIG. 5A, according to the fourth embodiment of the present disclosure.

FIG. 5A illustrates a front perspective view of a cover assembly 500, according to a fourth embodiment of the present disclosure. A line of separation "S4" in the cover assembly 500 defines a first cover 502 and a second cover 504. The cover assembly 500 includes a pair of coupling elements on each side thereof. Specifically, referring to FIG. 5B, the cover assembly 500 includes a first protrusion 506 and a second protrusion 508 located on the second cover 504 at a first side 510 thereof, and a third protrusion 512 and a fourth protrusion 514 located on the second cover 504 at a second side 516 thereof. Further, the cover assembly 500 includes a first engaging member 518 and a second engaging member 520 located on the first cover 502 at the first side 510 thereof, and a third engaging member 522 and a fourth engaging member 524 located on the first cover 502 at the second side 516 thereof. As seen in FIG. 5B, each coupling element of the pair of coupling elements is located adjacent to an aperture defined at the respective side of the cover assembly 500. Particularly, a first coupling element 530 is located above a first aperture 526 and a second coupling element 532 is located below the first aperture, with respect to a longitudinal axis "C4" of the cover assembly 500. The first aperture 526 is configured to allow access to the hot water outlet 120 of the mixing valve 116 and a second aperture 528 defined on the second side 516 of the cover assembly is configured to allow access to the knob 230 of the mixing valve 116.

Figure 5C:
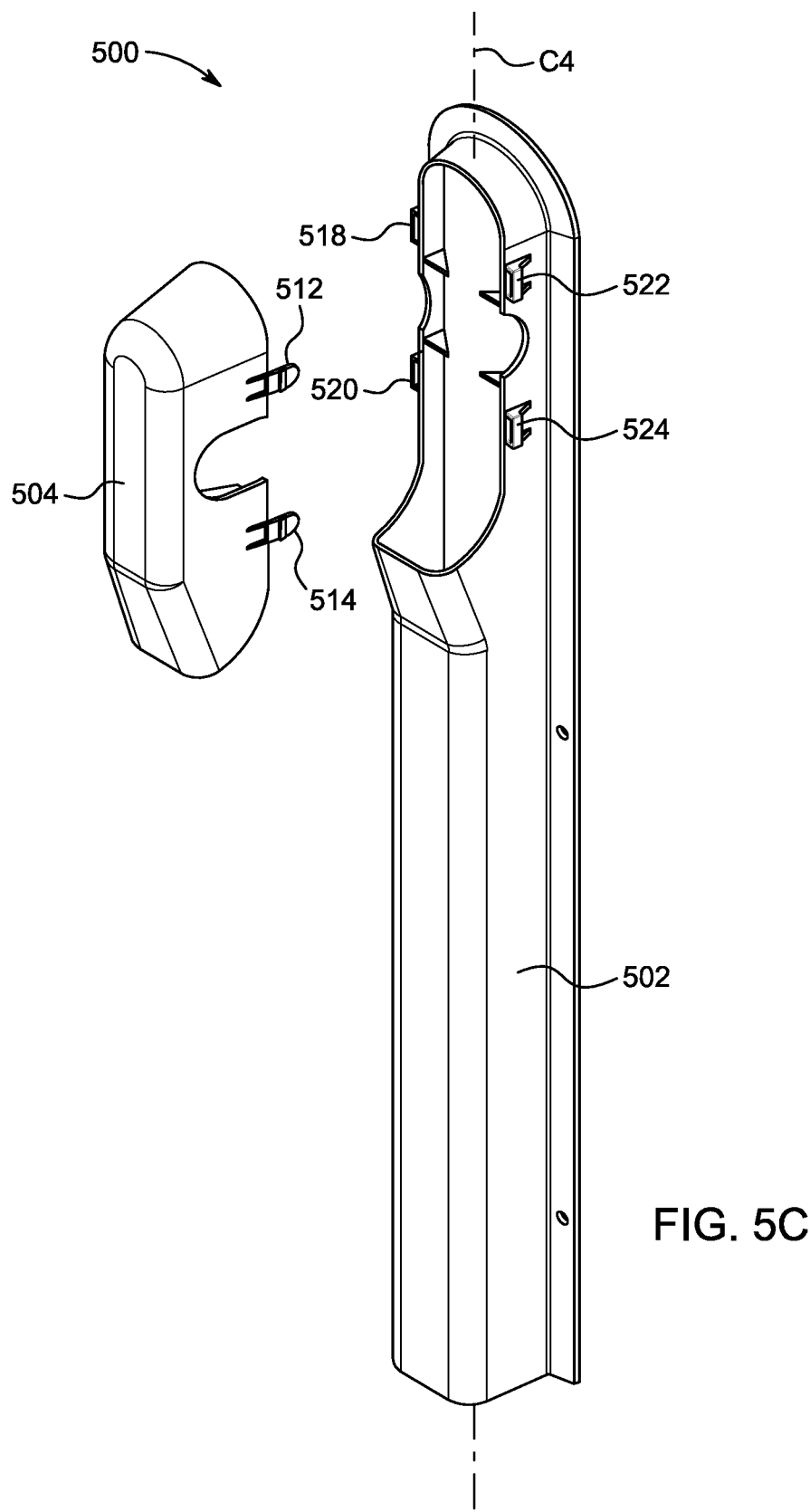
FIG. 5C is an exploded view of the cover assembly of FIG. 5A, according to the fourth embodiment of the present disclosure.

FIG. 5C illustrates an exploded view of the cover assembly 500. In order to couple the second cover 504 to the first cover 502, the second cover 504 is aligned with the first cover 502 in a direction perpendicular to the longitudinal axis "C4" of the cover assembly 500. The second cover 504 may then be moved towards the first cover 502 until the protrusions on the first side 510 and the second side 516 slide into corresponding engaging members of the first cover 502.

Figure 6:
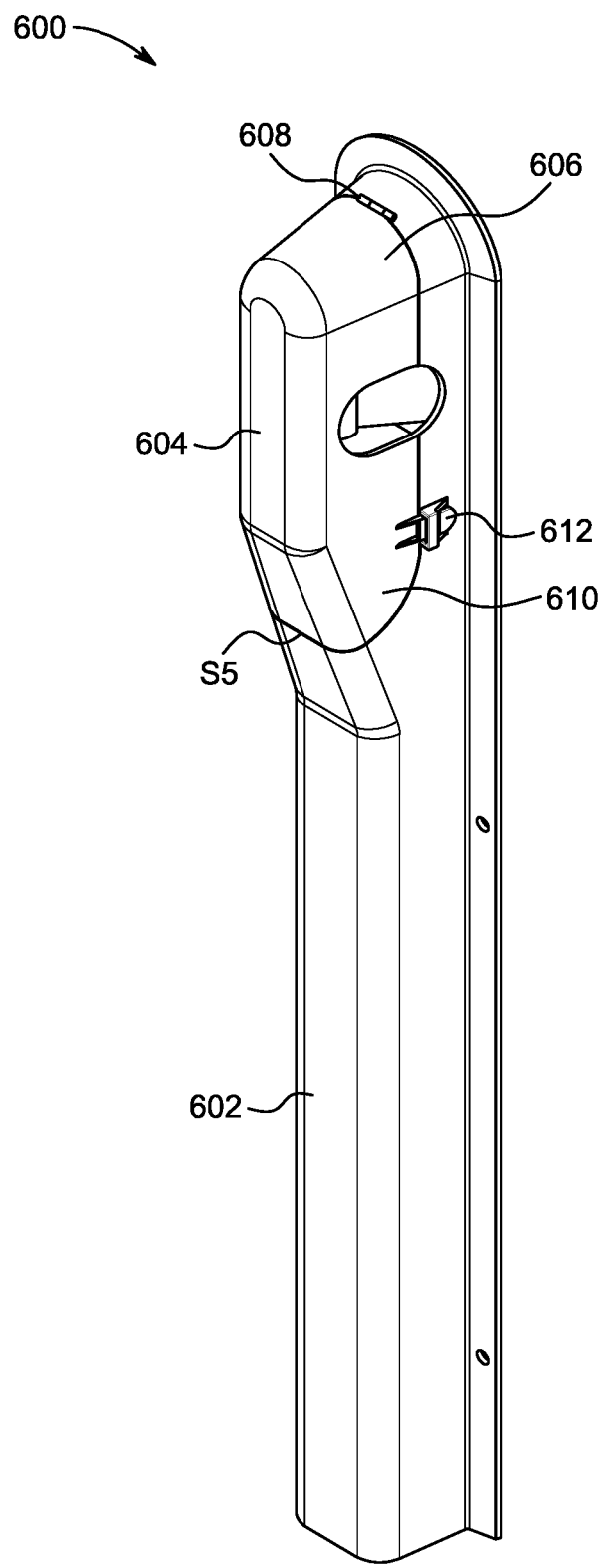
FIG. 6 is a front perspective view of the cover assembly, according to a fifth embodiment of the present disclosure.

FIG. 6 illustrates a front perspective view of a cover assembly 600, according to a fifth embodiment of the present disclosure. A line of separation "S5" in the cover assembly 600 defines a first cover 602 and a second cover 604. In an embodiment, a first end portion 606 of the second cover 604 is rotatably coupled to the first cover 602 via a hinge 608 and a second end portion 610 of the second cover 604 is coupled to the first cover 602 via a snap lock mechanism 612. Due to the presence of the hinge 608, the second cover 604 may be rotated about the hinge 608 to access the mixing valve 116.

Figure 7:
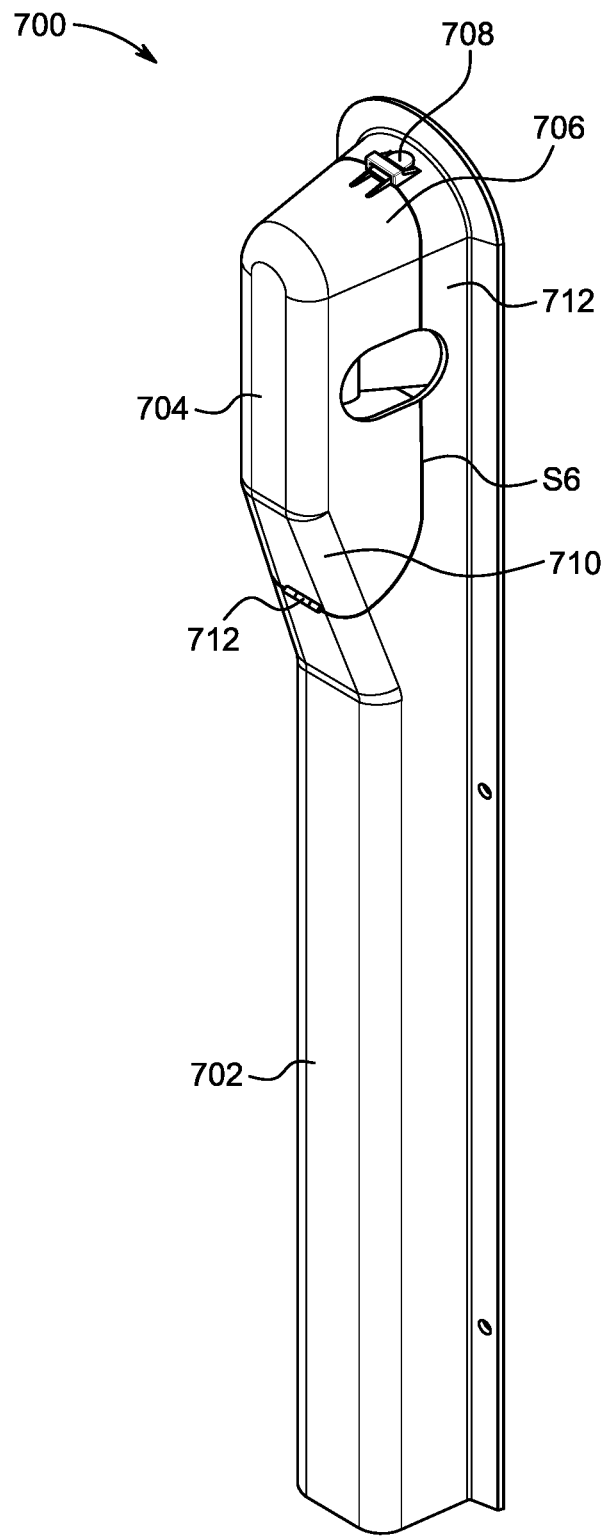
FIG. 7 is a front perspective view of the cover assembly, according to a sixth embodiment of the present disclosure.

FIG. 7 illustrates a front perspective view of a cover assembly 700, according to a sixth embodiment of the present disclosure. A line of separation "S6" in the cover assembly 700 defines a first cover 702 and a second cover 704. In an embodiment, a first end portion 706 of the second cover 704 is coupled to the first cover 702 via a snap lock mechanism 708 and a second end portion 710 is rotatably coupled to the first cover 702 via a hinge 712. Presence of the hinge 712 allows the second cover 704 to remain coupled with the first cover 702 when accessing the mixing valve 116.

Figure 8:
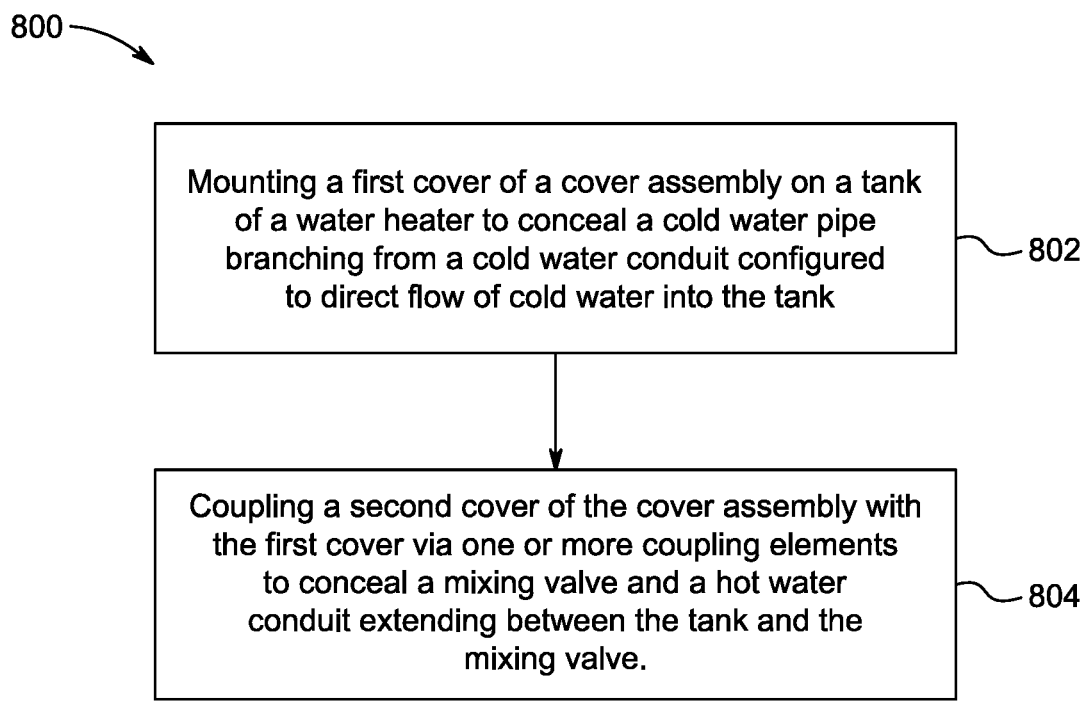
FIG. 8 is a flowchart of a method of mounting a cover assembly on a water heater, according to an embodiment of the present disclosure.

FIG. 8 illustrates a flowchart of a method 800 of mounting the cover assembly 108 on the tank 102 of the water heater 100. Although the method 800 is described with respect to the first embodiment, the method 800 is applicable to all the embodiments described with respect to FIG. 3A through FIG. 7.

At step 802, the method 800 includes mounting the first cover 122 of the cover assembly 108 on the tank 102 to conceal the cold water pipe 118 branching from the cold water conduit 104 configured to direct flow of cold water into the tank 102.

At step 804, the method 800 includes coupling the second cover 124 of the cover assembly 108 with the first cover 122 via one or more coupling elements to conceal the mixing valve 116 and the hot water conduit 112 extending between the tank 102 and the mixing valve 116.

At step 804, the method 800 further includes engaging at least one protrusion 214, 224 of the second cover 124 with at least one engaging member 216, 226 of the first cover 122. In an embodiment, the method 800 further includes aligning the second cover 124 with the first cover 122 in the direction along the longitudinal axis "C1" of the cover assembly 108. In another embodiment, the method 800 further includes aligning the second cover 124 with the first cover 122 in a direction inclined to the longitudinal axis "C1" of the cover assembly 108.

Since the cover assemblies of the present disclosure include two components, namely the first cover and the second cover, cost of tooling required to manufacture the cover assembly may be substantially reduced when compared to manufacturing a single piece cover. Further, the coupling elements reduce the number of fasteners required to mount the cover assembly on the tank. The minimum number of fasteners, such as the screws, eliminates need of multiple tools to mount the cover assembly on the tank. As such, reduced human effort and quick installation of the cover assembly may be achieved. Furthermore, the coupling elements eases the attachment and detachment of the second cover with respect to the first cover, thereby easing the serviceability of the mixing valve.

While aspects of the present disclosure have been particularly shown and described with reference to the embodiments above, it will be understood by those skilled in the art that various additional embodiments may be contemplated by the modification of the disclosed methods without departing from the spirit and scope of what is disclosed. Such embodiments should be understood to fall within the scope of the present disclosure as determined based upon the claims and any equivalents thereof.

What is claimed is:

1. A water heater comprising:
   a tank;
   a cold water conduit configured to direct flow of cold water into the tank;
   a hot water conduit extending radially outward from the tank and configured to direct hot water out of the tank;
   a mixing valve in fluid communication with each of the hot water conduit and a cold water pipe branching from the cold water conduit, the mixing valve being located adjacent to an outer lateral side surface of the water heater, wherein the mixing valve is configured to regulate temperature of hot water received from the hot water conduit; and
   a cover assembly mounted on the outer lateral side surface of the water heater and extending parallel with a longitudinal axis of the tank, the cover assembly configured to conceal each of the mixing valve, the hot water conduit, and the cold water pipe, wherein the cover assembly comprises:
   a first cover configured to conceal the cold water pipe extending along the longitudinal axis of the tank and extending between the mixing valve and the cold water conduit; and a second cover configured to conceal the mixing valve and the hot water conduit extending between the tank and the mixing valve, wherein the second cover defines a first aperture on a first side thereof and a second aperture on a second side thereof, the first aperture and the second aperture configured to allow access to the mixing valve, and wherein the second cover is detachably attachable to the first cover via one or more coupling elements, thereby permitting selective access to the mixing valve.

2. The water heater of claim 1, wherein the one or more coupling elements comprise a hinge, a snap lock, a buckle lock, a push button spring snap, or combinations thereof.

3. The water heater of claim 1, wherein the one or more coupling elements comprise a protrusion and an engaging member configured to releasably engage within the protrusion to define a snap lock mechanism.

4. The water heater of claim 3, wherein the protrusion is located on an inner surface of the first cover and the engaging member is located on an inner surface of the second cover.

5. The water heater of claim 3, wherein a first coupling element is located on a first side of the cover assembly and a second coupling element is located on a second side of the cover assembly.

6. The water heater of claim 1, wherein the second cover is mounted on the outer lateral side surface via mounting to the mixing valve.

7. The water heater of claim 6, wherein the second cover comprises an upper rib and a lower rib, wherein the mixing valve is configured to snap fit between the upper rib and the lower rib, such that the second cover snaps onto the mixing valve to secure the second cover to the water heater.

8. A cover assembly for a water heater, the cover assembly mounted on an elongated outer lateral side surface of the water heater comprising:

a first cover configured to conceal a cold water pipe extending along a longitudinal axis of a tank of the water heater and extending between a mixing valve and a cold water conduit configured to direct flow of cold water into the tank; and a second cover configured to conceal each of a hot water conduit extending outward from the tank and a mixing valve in fluid communication with the hot water conduit, the mixing valve being located adjacent to the elongated outer lateral side surface of the water heater, wherein the second cover defines a first aperture on a first side thereof and a second aperture on a second side thereof, the first aperture and the second aperture configured to allow access to the mixing valve, and wherein the second cover is detachably attachable to the first cover via one or more coupling elements permitting selective access to the mixing valve.

9. The cover assembly of claim 8, wherein the one or more coupling elements comprise a protrusion and an engaging member configured to releasably engage with the protrusion to define a snap lock mechanism.

10. The cover assembly of claim 9, wherein the protrusion is located on an inner surface of the first cover and the engaging member is located on an inner surface of the second cover.

11. The cover assembly of claim 9, wherein the second cover is snap fitted with the first cover along a longitudinal axis of the cover assembly.

12. The cover assembly of claim 9, wherein the second cover is snap fitted on top of the first cover along a longitudinal axis of the cover assembly.

13. The cover assembly of claim 9, wherein the second cover comprises two protrusions on each of a first side and a second side thereof, the first cover comprises two engaging members on each of a first side and a second side thereof, and wherein the second cover snaps over the first cover to allow the protrusions on the first side and the second side of the second cover to slide into corresponding engaging members of the first cover.

14. The cover assembly of claim 8, wherein the one or more coupling elements comprise a hinge, a snap lock, a buckle, a push button spring snap, or combinations thereof.

15. The cover assembly of claim 8, wherein the first aperture is configured to allow access to an outlet of the mixing valve, and wherein the second aperture is configured to allow access to a knob of the mixing valve.

16. A method of mounting a cover assembly on an outer side surface of a water heater, the method comprising:

mounting a first cover of the cover assembly on the outer side surface of the water heater to conceal a cold water pipe branching from a cold water conduit configured to direct flow of cold water into a tank of the water heater; and coupling a second cover of the cover assembly with the first cover along a longitudinal axis of the cover assembly via one or more coupling elements to conceal a mixing valve and a hot water conduit extending between the tank and the mixing valve, wherein the second cover defines a first aperture on a first side thereof and a second aperture on a second side thereof, the first aperture and the second aperture configured to allow access to the mixing valve, wherein the second cover is detachably attachable to the first cover permitting selective access to the mixing valve, and wherein the mixing valve is located adjacent to the outer side surface of the water heater.

17. The method of claim 16, wherein coupling the second cover with the first cover comprises engaging at least one protrusion of the second cover with at least one engaging member of the first cover.

18. The method of claim 17, wherein engaging the at least one protrusion of the second cover with the at least one engaging member of the first cover comprises aligning the second cover on top of the first cover along a longitudinal axis of the cover assembly.

19. The method of claim 17, wherein engaging the at least one protrusion of the second cover with the at least one engaging member of the first cover is achieved via a snap lock, a buckle lock, a push button spring snap, or combinations thereof.

* * * * *